(12) United States Patent
Kubota et al.

(10) Patent No.: US 6,934,763 B2
(45) Date of Patent: Aug. 23, 2005

(54) COMMUNICATION DATA RELAY SYSTEM AND METHOD OF CONTROLLING CONNECTABILITY BETWEEN DOMAINS

(75) Inventors: Makoto Kubota, Kawasaki (JP); Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 824 days.

(21) Appl. No.: 09/814,235

(22) Filed: Mar. 21, 2001

(65) Prior Publication Data

US 2002/0010799 A1 Jan. 24, 2002

(30) Foreign Application Priority Data

Apr. 4, 2000 (JP) ...................................... 2000-102701

(51) Int. Cl.[7] ........................ G06F 15/16; G06F 15/173
(52) U.S. Cl. ........................ 709/245; 709/225; 709/242
(58) Field of Search ............................... 709/245, 238, 709/227, 225, 242; 370/392

(56) References Cited

U.S. PATENT DOCUMENTS

| | | | | |
|---|---|---|---|---|
| 5,856,974 A | * | 1/1999 | Gervais et al. | 370/392 |
| 6,047,325 A | * | 4/2000 | Jain et al. | 709/227 |
| 6,178,455 B1 | * | 1/2001 | Schutte et al. | 709/228 |
| 6,393,488 B1 | * | 5/2002 | Araujo | 709/245 |
| 6,434,627 B1 | * | 8/2002 | Millet et al. | 709/245 |
| 6,493,765 B1 | * | 12/2002 | Cunningham et al. | 709/245 |
| 6,523,068 B1 | * | 2/2003 | Beser et al. | 709/238 |
| 6,581,108 B1 | * | 6/2003 | Denison et al. | 709/245 |
| 6,597,700 B2 | * | 7/2003 | Golikeri et al. | 370/401 |

* cited by examiner

Primary Examiner—William A. Cuchlinski, Jr.
Assistant Examiner—Michael Delgado
(74) Attorney, Agent, or Firm—Katten Muchin Rosenman

(57) ABSTRACT

A relay system, comprises interface units for accessing networks, a domain definition module, an connection definition module, a routing module, an address translation module for translating, when forwarding a communication data from one domain to another domain, a source address belonging to the source domain contained in the packet into a proxy host address belonging to the routing destination domain, and an address reverse translation module for translating, when receiving a communication data which has the proxy host address in destination address field, the destination address belonging to the source domain contained in the packet into the address belonging to the routing destination, and a control unit for controlling a connectability for routing between the two or more domains in accordance with definitions of the connection definition module.

7 Claims, 14 Drawing Sheets

FIG.5

| LOGICAL INTERFACE | DOMAIN |
|---|---|
| IF-0 | A |
| IF-1 | B |
| IF-2 | C |

FIG.6

| SOURCE DOMAIN \ DESTINATION DOMAIN | A | B | C |
|---|---|---|---|
| A | — | × | × |
| B | N | — | N |
| C | × | × | — |

FIG. 7

| BEFORE-TRANSLATION IP ADDRESS | AFTER-TRANSLATION IP ADDRESS |
|---|---|
| 133.160.5.2 | 10.25.60.2 |
| ..... | ..... |

FIG.8

| DESTINATION IP ADDRESS | NETMASK | NEXT HOP NODE IP ADDRESS | FORWARDING LOGICAL INTERFACE |
|---|---|---|---|
| 140.2.100.0 | 255.255.255.0 | — | IF-0 |
| 133.160.5.0 | 255.255.255.0 | — | IF-1 |
| 10.25.60.0 | 255.255.255.0 | — | IF-2 |
| 0.0.0.0 | 0.0.0.0 | 140.2.100.180 | IF-0 |

FIG.9

| IP ADDRESS | NETMASK | DOMAIN |
|---|---|---|
| 140.2.100.0 | 255.255.255.0 | A |
| 133.160.5.0 | 255.255.255.0 | B |
| 10.25.60.0 | 255.255.255.0 | C |
| 0.0.0.0 | 0.0.0.0 | A |

*FIG.12*

| DESTINATION DOMAIN / SOURCE DOMAIN | A | B | C |
|---|---|---|---|
| A | — | × | × |
| B | N | — | N |
| C | N | × | — |

COMMUNICATION DATA RELAY SYSTEM AND METHOD OF CONTROLLING CONNECTABILITY BETWEEN DOMAINS

BACKGROUND OF THE INVENTION

The present invention relates generally to a packet relay system, and more particularly to a connecting function between communication networks to which the packet can not be reached directly because of their having packet routing protocols different from each other, and to an address translating function.

(Concept of Domain)

A domain has hitherto been defined as follows on a network layer.

[Domain]

The domain is a range where a packet can be forwarded based on a common routing control rule (protocol) on the network layer. Note that a packet reachability from one area to another area using different routing control rules (protocols) can not be attained unless through the relay system which can relay between the areas using different routing control rules (protocols).

The followings are examples of the domains different from each other.

Intra-organization Network (Intranet): Independent routing control based on Interior Gateway Protocol (IGP) is carried out in the Intranet, while in the Internet the routing control based in Exterior Gateway Protocol (EGP) is conducted. Generally, routing data in the Intranet are not distributed to the Internet.

IPv4 Network and IPv6 Network: These networks are capable of co-existence and neighboring as well through common communication media. The IPv4 network and the IPv6 network have, however, different network layer address systems, and therefore the routing data are not compatible with each other. Hence, The IPv4 network and the IPv6 network are managed by different routing control protocols.

IP Network and AppleTalk Network: These networks respectively use IP and AppleTalk (which is a protocol of Apple computer Corp., U.S.A) as protocols of the network layer. The address systems and routing data are not compatible. Hence, the IP network and the AppleTalk network are managed by the different routing control rules (protocols).

(Domains Based on Same Network Layer Protocol)

The respective networks operated based on the different network layer protocols are not compatible in terms of their routing data and therefore segmented into different domains.

On the other hand, a plurality of networks operated based on the same network layer protocol are compatible in terms of their routing data, and can be therefore integrated into one domain in principle. In fact, however, those networks might be intentionally segmented into a plurality of domains. The followings are examples of the reason why the plurality of networks operated based on the same network layer protocol are segmented into the plurality of domains.

EXAMPLE 1

If the plurality of networks operated independently are connected, network layer addresses, which are so allocated as to be unique within the respective networks, lose the uniqueness, with the result that the routing data might lose meanings. For avoiding such a situation, the respective networks are defined as separate domains, and the thus defined domains are connected. Thus, the network layer addresses can be independently allocated within the respective domains.

EXAMPLE 2

If wishing to enhance the security of a certain network 1 against an encroachment from exterior network, the network 1 and the exterior network are segmented as separate domains. The information such as the routing data in the network 1 can be concealed from the exterior network, and hence a connection to the network 1 from the exterior network is cut off.

(Request for Segmentation Management of Networks)

For the reasons elucidated above, the intra-organization network and the extra-organization network are often segmented as the different domains. On the other hand, the priority is given to a reachability of the communication within the same organization. Hence, the network are operated based on the common routing control rule (protocol) within that organization in many cases.

There is, however, a case where the reachability of the communication is restricted even within one organization by defining ranges where the different routing control rules (protocols) are used, and the priority is given to a usability in terms of the security and management. This is, for example, a case such as configuring an inter-organization network within the same enterprise group, connecting a division requiring particularly the security to another division within the same enterprise, connecting associated companies within the same enterprise, and so on.

(Prior Art)

As described above, even when the networks has hitherto been operated based on the same network layer protocol, the intra-organization network and the extra-organization network are segmented as the different domains, and the interior of the same organization is configured as a common domain because of giving the priority to the reachability of the communication. Accordingly, the number of the domains needed on the networks using the same network layer protocol is 2 at the most, i.e., the intra-organization and the extra-organization.

Shown below are packet routing procedures of the relay system (hereinafter designated by the numeral 1) positioned between the intra-organization and the extra-organization in a case where the intra-organization network and the extra-organization network are managed as the separate domains.

To start with, preconditions for routing are given.

[Condition 1]

Each node (communication device) in the intra-organization network is capable of obtaining a network layer address of an extra-organization node desired to be connected by means of obtaining the network layer address of this node from a name of the extra-organization node.

[Condition 2]

Each node in the intra-organization network exchanges the routing data within the organization. Each of these nodes has such pieces of routing data that the relay system 1 is included on a route of the packet addressed other than the network layer address allocated within the organization. Namely, each node in the intra-organization network previously knows that the relay system 1 is included on the route to the extra-organization node.

[Condition 3]

Each node in the extra-organization network previously knows the routing data to the relay system 1 serving as a proxy host of the intra-organization node. The routing data to this proxy host contains, as a destination, the network layer address of the relay system 1 in the extra-organization network.

In such a case, the relay system 1 operates as follows:

[Operation 1]

A first case is that the relay system 1 receives, from the intra-organization, the packet of which a destination is the network layer address of the extra-organization. In this case, to begin with, the relay system 1 replaces a source address of this packet with an address for the proxy host in the extra-organization. The address for proxy host is the network layer address of the extra-organization provided in the relay system 1 so that the relay system 1 behaves as the proxy host of the intra-organization node in the extra-organization. Next, the relay system 1 forwards this packet outside the organization. This packet is thereby forwarded with the proxy host serving as a source.

[Operation 2]

A second case is that the relay system 1 receives from the extra-organization the packet of which the destination is the address for proxy host of the intra-organization node. In this case, to start with, the relay system 1 translates a destination address given to this packet by replacing the network layer address for the proxy host with a network layer address of the intra-organization node. Next, the relay system 1 routes this packet inside the organization. This packet is thereby routed within the organization with the intra-organization node serving as a destination.

The operations of the relay system 1 for segmenting the two intra-and extra-organization domains, have thus been described.

There is, however, a case in which a plurality of domains need to be defined also within the organization other than the definitions inside and outside the organization. In such a case, the conventional relay system is incapable of recognizing domains other than the categories such as intra-and extra-organization. Therefore, even if the multiplicity of domains (or networks) satisfy the [Condition 1] through [Condition 3] as the organization, the conventional relay system is incapable executing such an operation as to determine a connection rule for every domain and route the packet between the domains in accordance with this connection rule.

SUMMARY OF THE INVENTION

It is a primary object of the present invention, which was devised to obviate the problems inherent in the prior art described above, to provide a function of, if a multiplicity of domains (or networks) satisfy the above [Condition 1] through [Condition 3] as organizations, defining and managing these domains and a function of restrictively establishing a connection between the domains with security and independencies of maintenance being ensured.

To accomplish this object, according to one aspect of the present invention, a relay system for relaying two or more networks to which one or more communication devices are connected, comprises two or more interface units for accessing the networks, a domain definition module for defining domains as a system framework including one or more networks, an connection definition module for defining a connectability between the two or more domains, a routing module for determining a routing destination of the communication data, an address translation module for translating, when forwarding the communication data from one domain to another domain, a source address belonging to the source domain contained in the packet into the proxy host address belonging to the routing destination domain, and an address reverse translation module for translating, when receiving the communication data which has the proxy host address in destination address field, the destination address belonging to the source domain contained in the packet into the address belonging to the routing destination, and a control unit for controlling a connectability for routing between the two or more domains in accordance with definitions of the connection definition module.

Herein, the domain is categorized as a system framework including one or more networks and is a routing target to which present communication data relay system routes the data. The control of the connectability for routing implies that for example, the data are routed if the connection between the domains is permitted based on the definition of the connection definition module, but are not routed if the connection between the domains is not permitted.

The source domain is a domain, existing on the source side, of the two domains relayed by the relay system. Further, the routing destination domain is a domain, existing on the destination side, of the two domains relayed by the relay system. The routing destination domain may be simply called a destination domain.

Further, the domain definition module may define the domain by information for identifying the interface unit connected to this domain.

The domain definition module may be defined per domain by an address (or an address for identifying the communication device connected to the network included in the domain) for identifying a network included in the domain.

The control unit may discard such a piece of communication data between domains that the domain corresponding to the interface unit receiving the communication data, is different from the domain corresponding to the interface unit to which source address of the communication data is corresponded in the routing module.

As explained above, according to the present invention, the communication data relay system for relaying the networks includes the domain definition module for defining the domain as a system framework containing one or more networks, and the connection definition module for defining the connectability between the plurality of domains. The connectability for routing between the plurality of domains is controlled based on the definition of the connection definition module, and hence the connection between the domains can be established, wherein security and independencies of maintenance are ensured.

BRIEF DESCRIPTION OF THE DRAWINGS

FIG. 5 is a chart showing an example of structure of a domain definition table 2;

FIG. 6 is a chart showing an example of structure of an inter domain connection definition table 4;

FIG. 7 is a chart showing an example of structure of an address translation table 7;

FIG. 8 is a chart showing an example of structure of a routing table 10;

FIG. 9 is a chart showing an example of structure of the domain definition table 2 in a second embodiment of the present invention;

FIG. 12 is a chart showing an example of structure of the inter domain connection definition table 4;

DETAILED DESCRIPTION OF THE PREFERRED EMBODIMENTS

Preferred embodiments of the present invention will hereinafter be described with reference to the accompanying drawings.

(First Embodiment)

A first embodiment of the present invention will hereinafter be discussed referring to FIGS. 1 through 8.

Figure 1:
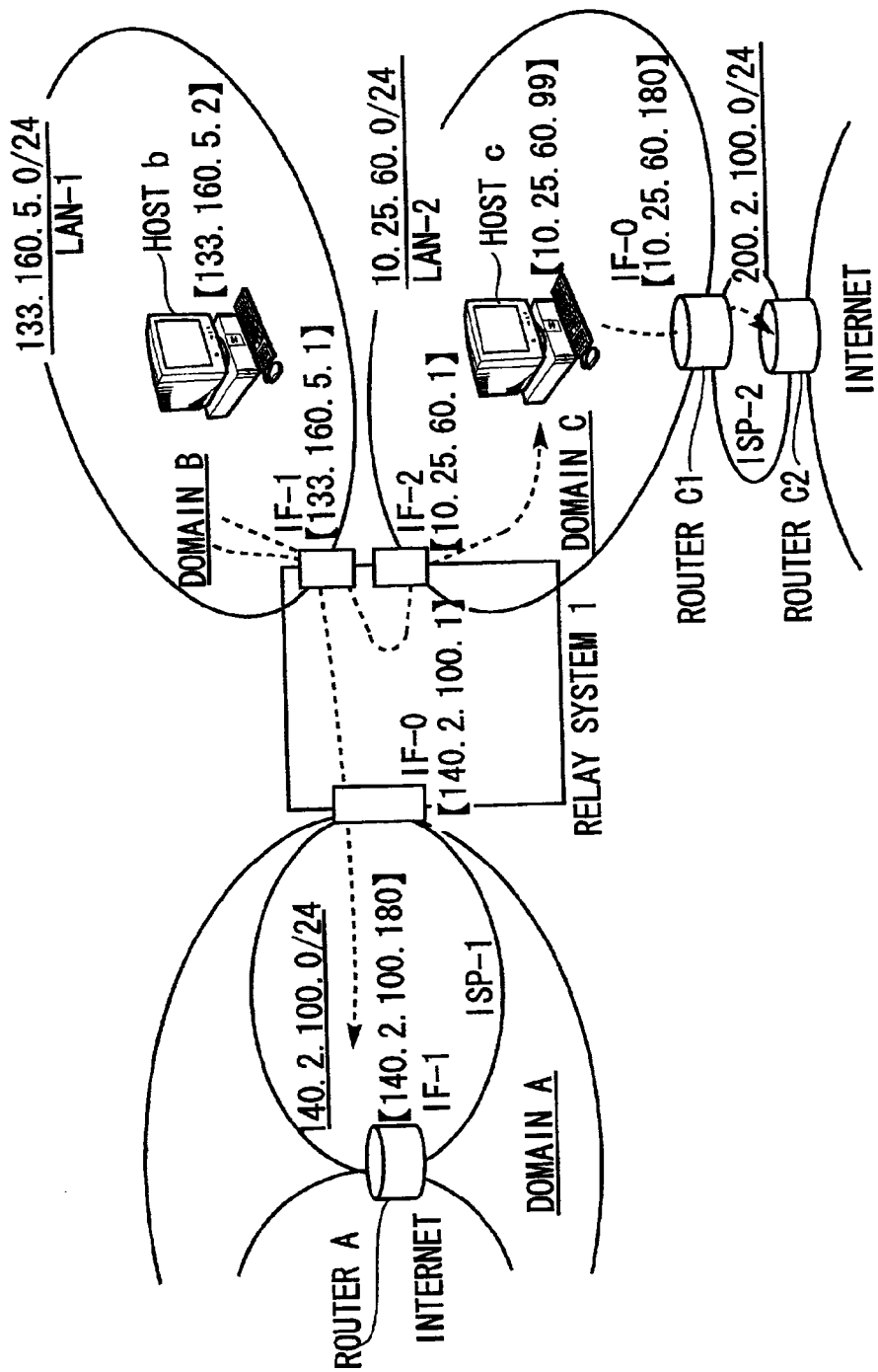
FIG. 1 is a view showing a network architecture in a first embodiment of the present invention.
Figure 2:
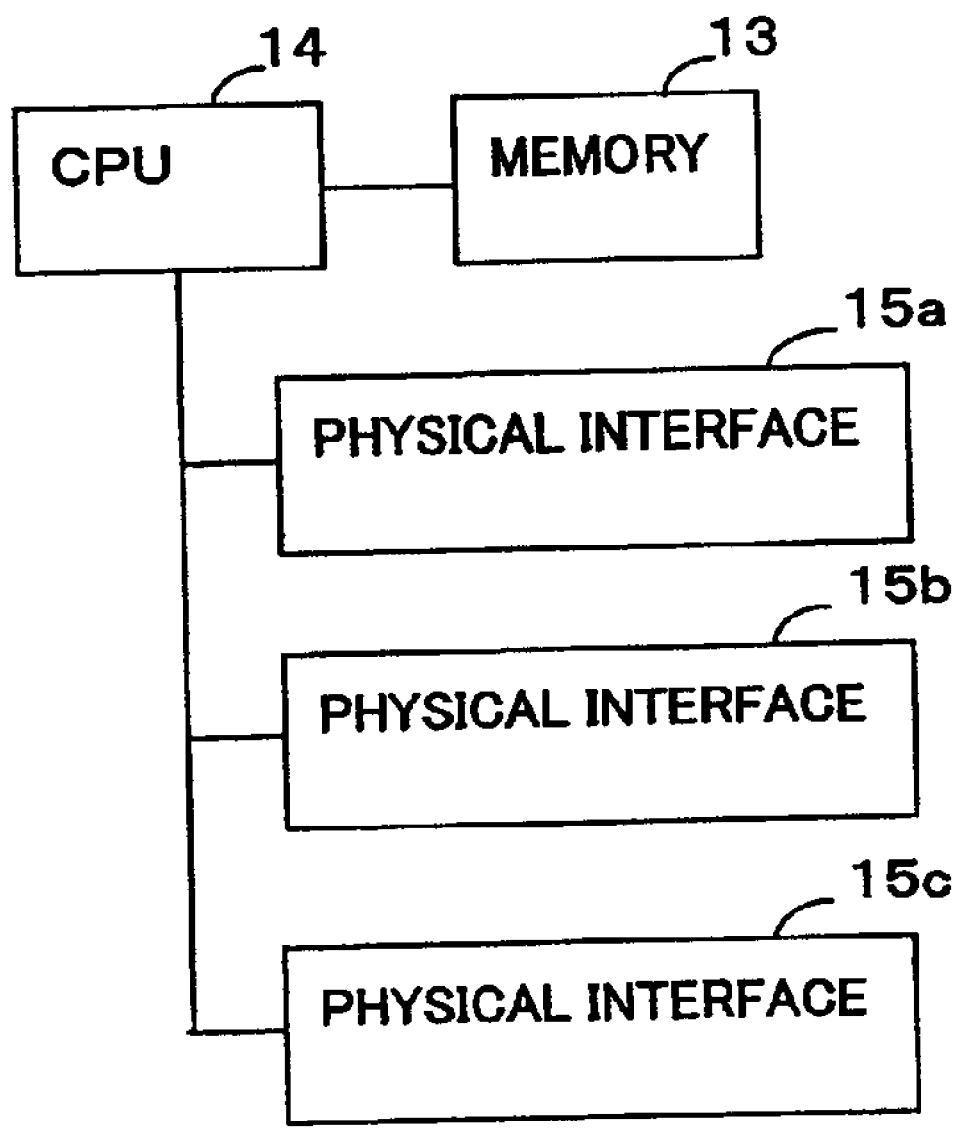
FIG. 2 is a diagram showing a hardware architecture of a relay system 1.
Figure 3:
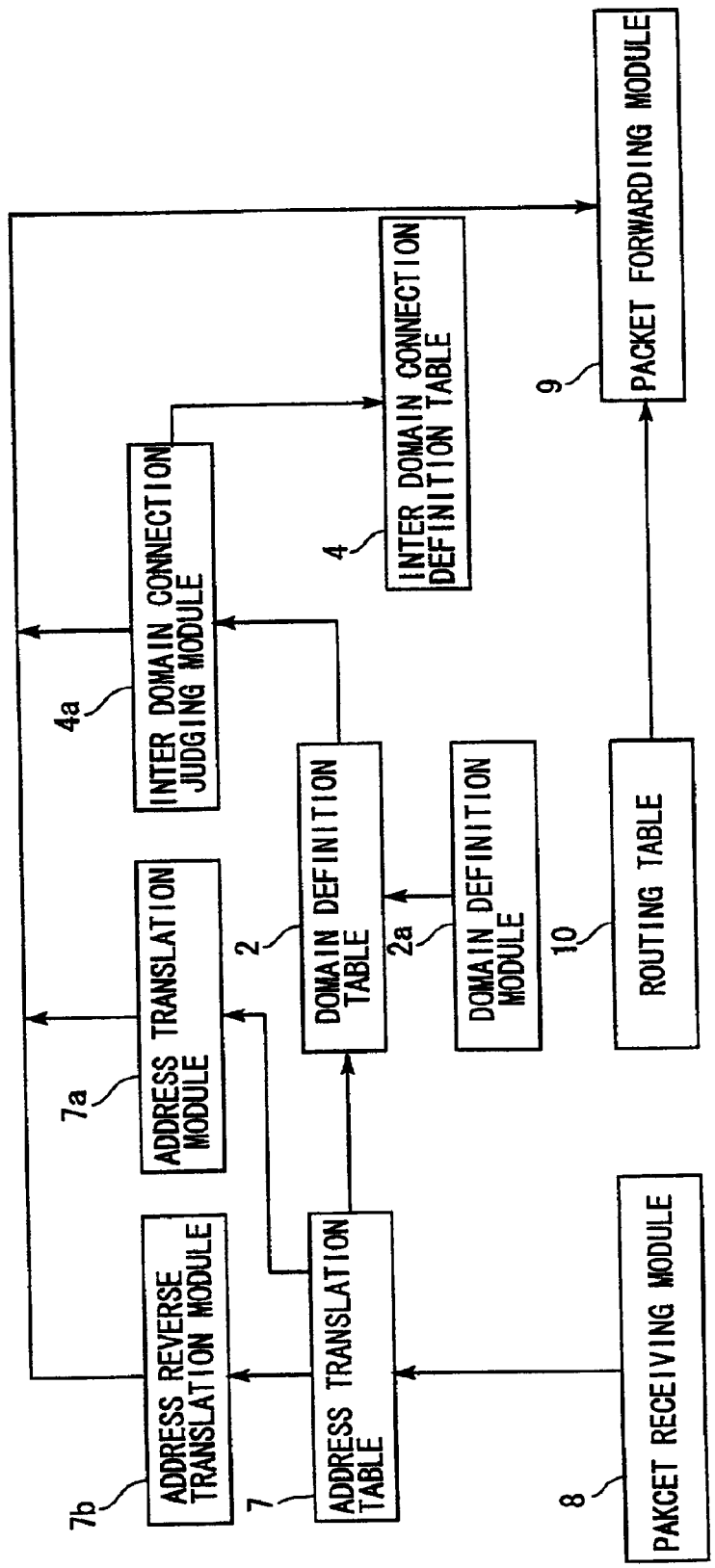
FIG. 3 is a view showing an architecture of functions of the relay system 1.
Figure 4:
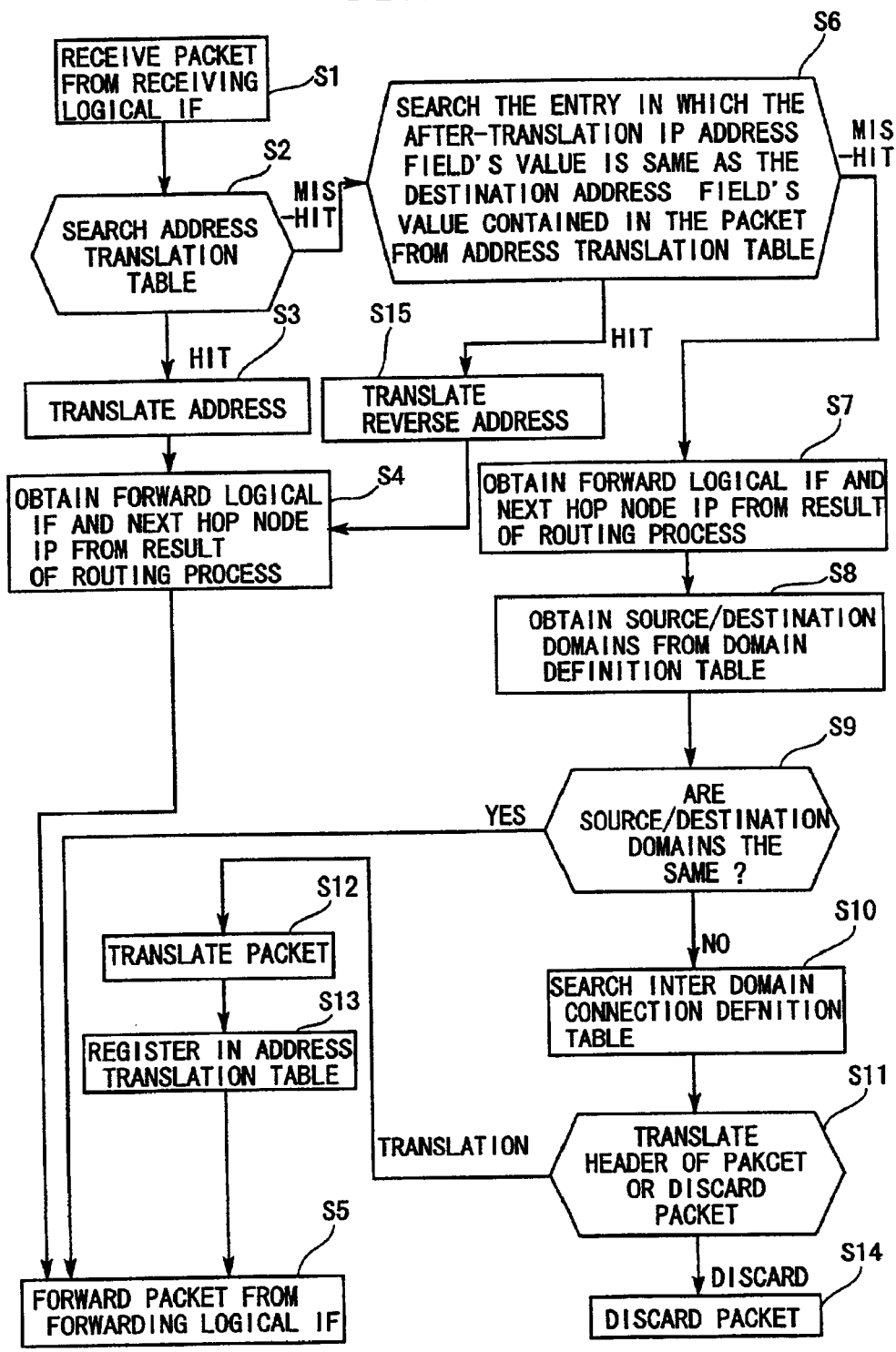
FIG. 4 is a flowchart showing processes of the relay system 1.

FIG. 1 is a view showing a network architecture in the first embodiment. FIG. 2 is a diagram showing a hardware architecture of a relay system 1 for connecting a plurality of networks. FIG. 3 is a diagram showing functions of the relay system 1. FIG. 4 is a flowchart showing a control program executed by a CPU 14 of the relay system 1 shown in FIG. 2. FIGS. 5 through 8 are diagrams each showing a data structure of a table used by the CPU 14 when executing the control program.

<Network Architecture>

FIG. 1 is the view showing the network architecture in the first embodiment. This network includes an extra-organization network (Extranet) ISP-1 (which is hereinafter simply referred to as ISP-1, and ISP-2 represents the same network) provided by a service provider, intra-organization networks (Intranet) LAN-1, LAN-2 (which are hereinafter simply referred to as LAN-1, LAN-2), and the Internet.

[ISP-1]

ISP-1 is classified as the extra-organization network provided by the service provider. A network address for identifying ISP-1 is 140.2.100.0/24. ISP-1 is connected via a router A to the Internet. This router A is identified by an address 140.2.100.180 in ISP-1.

[ISP-2]

ISP-2 is classified as the extra-organization network provided by the service provider. A network address for identifying ISP-2 is 200.2.100.0/24. ISP-2 is also connected via a router C2 to the Internet.

[LAN-1]

LAN-1 is classified as the intra-organization network of an associated company 1. A network address for identifying the network LAN-1 is 133.160.5.0/24. LAN-1 is connected via ISP-1 to the Internet.

[LAN-2]

LAN-2 is classified as the intra-organization network of an associated company 2. A network address for identifying the network LAN-2 is 10.25.60.0/24. LAN-2 is connected via a router C1 to ISP-2. ISP-2 is a network provided by the service provider with which the associated company 2 independently makes a contract. Further, the router C1 is identified by an address 10.25.60.180 in LAN-2. Moreover, LAN-2 is connected via ISP-2 to the Internet.

The relay system 1 has logical interfaces (corresponding to interface units) IF-0, IF-1, IF-2 for making connections between domains. The following domains are defined in there lay system 1 with respect to the above networks.

[Domain A]

A domain A is configured by ISP-1 and the Internet. Further, the domain A is relayed via the logical interface IF-0. An address of IF-0 in the network ISP-1 is 140.2.100.1.

[Domain B]

A domain B is configured by LAN-1. Further, the domain B is relayed via the logical interface IF-1. An address of IF-1 in the network LAN-1 is 133.160.5.1.

[Domain C]

A domain C is configured by LAN-2. LAN-2 is, however, connected to the Internet as described above. Further, the domain C is relayed via the logical interface IF-2. An address of IF-2 in the network LAN-2 is 10.25.60.1.

In the first embodiment, connection policies of the communications via the relay system 1 are assumed as follows:

(1) The connection from the associated company 1 (LAN-1) to ISP-1 and the connection via the Internet via ISP-1, are permitted.

(2) The connection from the associated company 1 (LAN-1) to the associated company 2 (LAN-2) is permitted.

(3) Other domain-to-domain connections are all unpermitted.

An architecture and processes of the relay system 1 for attaining those connections will hereinafter be described.

<Hardware Architecture of Relay System 1>

FIG. 2 is the diagram showing the hardware architecture of the relay system 1 in the first embodiment.

This relay system 1 includes a memory 13 for storing a control program and data, the CPU 14 (corresponding to a control unit) for executing the control program stored in the memory 13, and a plurality of physical interfaces 15a, 15b, 15c controlled by the CPU 14 to perform communications with other communication devices.

The memory 13 is stored with the control program executed by the CPU 14 and the data processed by the CPU 14.

The CPU 14 executes the control program stored in the memory 13, thereby providing a function as the relay system 1.

The physical interfaces 15a, 15b, 15c transmit the communication data to a network 10 for receive the communication data from the network in accordance with a command given from the CPU 14.

<Architecture of Functions>

FIG. 3 shows an architecture of functions of the relay system 1. The functions of the relay system 1 are a domain definition table 2 (corresponding to a domain definition module) stored in the memory 13, an inter domain connection definition table 4 (corresponding to an connection definition module), and an address translation table 7. Further, the functions of the relay system 1 are domain definition module 2a, an inter domain connection judging module 4a, an address translation module 7a and an address reverse conversion module 7b, which are executed as software components of the control program by the CPU 14.

[Domain Definition Table 2]

The domain definition table 2 is categorized as a table stored with mappings of the domains to one or more logical interfaces IF-0 etc. A logical interface field is stored with pieces of information for identifying the interfaces when the control program of the relay system 1 communicates with the respective domains. In the first embodiment, the logical interface is a logical terminal connected to the domain via any one of the physical interfaces 15a, 15b and 15c shown in FIG. 2.

Figure 5:
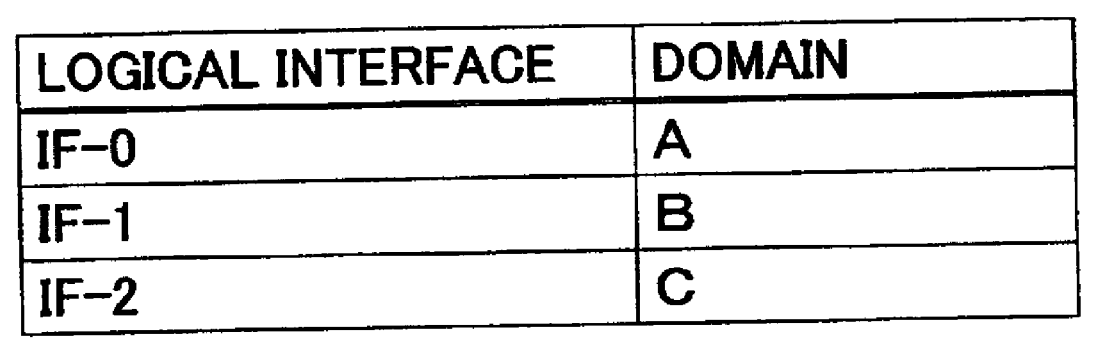

FIG. 5 shows elements set in the domain definition table 2, corresponding to the network architecture shown in FIG. 1. As shown in FIG. 5, the domains A, B and C are defined respectively by logical interface numbers IF-0, IF-1 and IF-2 in the communications. Namely, the relay system 1 relay the communication data via the logical interfaces IF-0, IF-1 and IF-2 as communication data with nodes embraced by the domains A, B and C.

[Inter Domain Connection Definition Table 4]

The inter domain connection definition table contains a definition of connectability between an arbitrary couple of domains, and a definition of an address translation algorithm used when establishing a connection between the connectable domains. The inter domain connection definition table 4 is set by use of the domain definition module 2a.

FIG. 6 shows the definitions in the inter domain connection definition table 4 in the network shown in FIG. 1.

Referring to FIG. 6, "N" indicates that the connection is permitted by implementing NAT (IP Network Address Translator). NAT is one category of the address translation function. When the relay system 1 forwards a packet (1) from one domain (A) to another domain (B), a source IP address (A1) is replaced by NAT into an IP address (B1) belonging to domain (B) on the relay system 1, whereby the packet is routed. When the relay system 1 receives a packet (2) from domain (B) to IP address (B1) as are sponse of packet (1), a destination IP address (B1) is replaced by NAT into IP address (A1) belonging to domain (A) on the relay system 1, whereby the packet is routed. As a result, in domain (B), this relay system 1 behaves as proxy for the host with IP address (A1) belonging to domain (B).

Referring again to FIG. 6, the symbol "X" represents the connection unpermitted.

Further, the symbol "-" represents a normal connection (within the same domain) based on the packet forwarding process.

[Address Translation Table 7]

The address translation table 7 is a table stored with a mapping of the source IP address before the address translation in the source domain to the IP address after the address translation in the destination domain. FIG. 7 shows an example of the addresses registered in the address translation table 7 in the first embodiment.

[Routing Table 10]

The routing table 10 contains the mapping from destination IP address to the pair of an address of a node to which the packet should be forwarded next (which is called a "hop") and a logical interface from which the packet should be sent.

FIG. 8 shows a structure of the routing table 10 in the first embodiment. As shown in FIG. 8, this routing table 10 consists of a destination IP address field, a netmask field, a next hop node IP address (corresponding to a routing destination) field and a forwarding logical interface field.

Referring to FIG. 8, the symbol [-] in the next hop node IP address field indicates that the packet is reachable to the destination network from the physical interface 15a etc.

Referring again to FIG. 8, [0.0.0.0] entered in the destination IP address field indicates a default route. This default route is a routing destination of the packet of which a destination IP address becomes coincident with none of the entries as a result of searching the routing table 10.

Note that if the relaying system 1 is aware of both of the Internet connected to ISP-1 and the Internet connected to ISP-2, the routing data fall into a confusion. Then, the relaying system 1 is set so as to recognize only the routing data of LAN-2 as the routing data of the domain C.

Further, the relaying system 1, it is assumed, previously knows the data of all the domains (A, B and C) connected to the relaying system 1 as defined in the routing table 10. Moreover, according to the inter domain connection definition table 4, the communication from the domain B to the domain A an the communication from the domain B to the domain C, are permitted. In this case, it is assumed that the domain B previously knows the routing data of the domains A, C by obtaining the routing table 10 as the routing data.

[Domain Definition Module 2a]

The domain definition module 2a is used for setting the domain definition table 2 for defining the relation of logical interfaces IF-0, IF-1, IF-2 and the domains, and the inter domain connection definition table 4 for defining the connection between the domains. This domain definition module 2a is categorized as one of the functions of the control program. The domain definition module 2a is executed when a user makes log-in to the CPU 14 of the relaying system 1 via the network. The domain definition module 2a, when started, displays an unillustrated domain definition table set screen and an unillustrated inter domain connection definition table set screen on the display screen of the user's terminal via the network, and prompts the user to execute setting.

[Inter Domain Connection Judging Module 4a]

The inter domain connection judging module 4a judges a connectability of an arbitrary couple of domains among the plurality of domains, and determines an address translation algorithm used when establishing the connection. The inter domain connection judging module 4a is actualized as a function of the control program executed by the CPU 14.

[Address Translation Module 7a]

The address translation module 7a, based on the address translation table 7, translates a source address contained in a packet header when forwarding the packet.

If the before-translation source address is not defined in the address translation table 7, the address translation module 7a adds a definition of this source address to the address translation table 7.

Namely, the address translation module 7a makes a mapping of the source address of the packet reached from the source domain to an address for proxy host, which is usable in the destination domain. The address for proxy host is defined as an address within the destination domain pooled in this relaying system 1. Further, the address translation module 7a writes this address mapping to the address translation table 7 as the translation rule for forwarding the packet the packet from the source host (with the source address in the packet) to the destination host (with the destination address in the packet).

[Address Reverse Translation Module 7b]

The address reverse translation module 7b translates a destination address contained in a packet header by replacing the proxy host's address for the source domain with the address usable in the destination address domain, when forwarding the packet sent in reverse direction of the direction written in the address translation table 7.

Namely, from the address translation table 7, the address reverse translation module 7b searches the entry in which the after-translation IP address field's value is same as the destination address field's value contained in the packet. And the address reverse translation module 7b replace the destination address field of the packet with the before-translation IP address included in the entry.

The address reverse translation module 7b is actualized as a function of the control program executed by the CPU 14.

[Packet Receiving Module 8]

A packet receiving module 8 monitors the logical interfaces IF-0, IF-1, IF-2, and receives the packets. The packet receiving module 8 is actualized as a function of the control program executed by the CPU 14.

[Packet Forwarding Module 9]

A packet forwarding module 9 refers to the routing table 10 and commands one of the logical interfaces IF-0, IF-1, IF-2 to forward the packet. The packet forwarding module 9 is actualized as a function of the control program executed by the CPU 14.

Operations involving the use of the modules described above will hereinafter be explained.

The relay system 1, when receiving the packet on the network layer, searches the address translation table 7 by use of the address translation module 7a. If a source address of this packet exists in the address translation table 7, the address translation module 7a of the relay system 1 replaces the source address in accordance with the data in the before-translation IP address field and in the after-translation IP address field registered in the address translation table 7.

If this source address does not exist in the address translation table 7, the relay system 1 uses the address reverse translation module 7b. To be specific, the relay system 1 searches, from the address translation table 7, the entry in which the after-translation IP address field's value is same as the destination address field's value contained in the packet. If the data exist as a result of this search, the relay system 1 judges that this packet is a response packet. Then, the address reverse translation module 7b of the relay system 1 executes an address reverse translation i.e. replacing the destination address field of the packet with the before-translation IP address included in the entry.

If unable to detect the address in the address translation table 7 even by searching in the way of replacing the before-translation data with the after-translation data, the relay system 1 judges that the communication through within the domain to the packet sender from the packet destination is not yet performed. Then, the relay system 1 checks whether or not this packet is forwarded in the communication through within the domain. To start with, the relay system 1 refers to the domain definition table 2 and determines the source domain and the destination domain on the basis of the information incidental to the frame (source address/destination address, the receiving logical interface/sending logical interface, etc).

If the source domain is different from the destination domain, the inter domain connection judging module 4a of the relay system 1 refers to the inter domain connection definition table 4 and thereby determines whether or not the packet is routed to the destination domain and which address translation algorithm is used. Based on a result of this determination, the relay system 1 registers the address translation table 7 with a mapping between the before-translation source address and the after-translation source address.

With the operations described above, it is feasible to execute routing between the variety of different domains connected to the relay system 1.

<Function and Effect>

FIG. 4 is a flowchart showing the operations of this relay system 1. The CPU 14 of the relay system 1 executes the control program stored in the memory 13, thereby providing the function of the relay system 1.

Given at first is an explanation of a process when forwarding the packet to a host c (IP address: 10.25.60.99) in the domain C from a host b (IP address: 133.160.5.2) in the domain B. According to the inter domain connection definition table 4 (FIG. 6), the connection from the domain B to the domain C is permitted by executing the NAT process, and hence this packet is processed as follows.

1. With respect to a packet having a couple of addresses {source IP address/destination IP address: 133.160.5.2/ 10.25.60.99}, the relay system 1, if the destination IP address of the packet corresponds to the logical interface of the relay system 1, judges that this packet is addressed to the relay system 1, and receives the same packet via the logical interface. In this example of the operation, however, the packet destination IP address does not correspond to the logical interface. Therefore, the relay system 1 receives the packet from the forward-capable logical interface IF-1 on the physical interface having received a frame (step S1, which will hereinafter be abbreviated to S1).

2. Next, the relay system 1 searches such an entry that the packet source IP address [133.160.5.2] is coincident with the before-translation IP address in the address translation table 7. If this search is hit (in a judgement in S2), the relay system 1 replaces the source IP address of the packet with the after-translation IP address [10.25.60.21] in the address translation table 7 (S3).

3. The relay system 1 searches the routing data from the routing table 10 with the destination IP address [10.25.60.99] serving as a key (a routing process). As a result, the relay system 1 obtains IF-2 as a forwarding logical interface. Further, the relay system 1 recognizes a direct reachability to a next destination node to which the packet is forwarded from IF-2 (S4). As a result of the above processes, the relay system 1 forwards the packet to the destination node via this interface IF-2 (S5).

4. If the search for the address translation table 7 is not hit (which is a mis-hit in the judgement in S2), the relay system 1 searches, from the address translation table 7, the entry in which the after-translation IP address field's value is same as the destination address field's value contained in the packet (S6).

5. This packet is not a reply packet, and hence the search is not hit when searching the entry in which the after-translation IP address field's value is same as the destination address field's value contained in the packet from address translation table 7 (which is the mis-hit in the judgement in S6). Then, it can be known that the communication through within the domain specified in this packet is not yet performed. In this case, the relay system 1 checks whether or not a destination through within the relevant domain is specified in this packet in the following manners.

To begin with, the relay system 1 searches the routing table 10 with the destination IP address [10.25.60.99] (the routing process). As a result, the relay system 1 obtains IF-2 as the forwarding logical interface, and recognizes the direct reachability to the next destination node to which the packet is forwarded from IF-2 (S7).

6. Next, the relay system 1 refers to the domain definition table 2 and thereby obtains the source domain B and the destination domain C as the domains corresponding to the receiving logical interface IF-1 and the forwarding logical interface IF-2 (S8).

7. Next, the relay system 1 judges whether the destination domain is identical with the source domain or not (S9). If the destination domain is different from the source domain (No-judgement in S9), the relay system 1 judges that this packet is forwarded through within the relevant domain.

Then, the relay system 1 searches the inter domain connection definition table 4 (S10), and judges a connectability from the domain B to the domain C to decide the packet may be translated or not (discarded) (S11). In the first embodiment, a connection policy from the domain B to the domain C is aNAT-based connection (in the case of "translation" in S11), and hence the relay system 1 executes the NAT process on this packet (S12). Next, the relay system 1 registers the address translation table 7 with an address mapping between the before-translation address and the after-translation address (S13). Thereafter, the relay system 1 forwards the packet from this logical interface IF-2 (S5).

With the steps described above, the relay system 1 executes the forwarding of the packet from the domain B to the domain C. Note that if the destination domain is judged to be identical with the source domain in S9 (Yes-judgement in S9), the relay system 1 forwards the packet as it is from the forwarding logical interface (S5).

Next, an operation performed when a response packet to this packet is sent back from the host c.

8. With respect to a packet having a couple of addresses {source IP address/destination IP address: 10.25.60.99/ 10.25.60.2}, the relay system 1, if the destination IP address of the packet corresponds to the logical interface of the relay system 1, judges that this packet is addressed to the relay system 1, and receives the same packet via the logical interface. The destination IP address of the packet received does not, however, correspond to the logical interface. Therefore, the relay system 1 receives the packet from the forward-capable logical interface IF-2 on the physical interface having received the frame (S1).

9. Next, the address translation module 7a of the relay system 1 searches such an entry that the packet source IP address [10.25.60.99] is coincident with the before-translation IP address in the address translation table 7 (S2).

In this case, the search is not hit, and hence the address reverse translation module 7b of the relay system 1 searches, from the address translation table 7, the entry in which the after-translation IP address field's value is same as the destination address field's value contained in the packet (S6). This second search is hit, and therefore the relay system 1, based on the searched result, replaces the destination address field (the value is [10.25.60.2] of the packet with the before-translation IP address (the value is [133.160.5.2]) included in the entry (S15).

10. Next, the relay system 1 searches the routing data from the intra-system routing table 10 with the destination IP address [133.160.5.2] serving as a key (a routing process). As a result, the relay system 1 obtains IF-1 as a forwarding logical interface. Further, the relay system 1 recognizes a direct reachability to a next destination node to which this packet is forwarded from IF-1 (S4). Further, the relay system 1 executes the process of forwarding the packet via this interface IF-1 (S5), With the processes described above, the packet is routed from the domain C to the domain B.

The processes (1)~(10) explained above are carried out, whereby the relay system 1 is capable of communication from the domain B to the domain C.

It is previously described that the domain B may have recognized the routing data of the domains A and C. It is actualized by any one of the following conditions a) and b).

a) The relay system 1 exchanges the routing data with each of the domains on the basis of the following criteria 11(A)~11(C).

b) The routing data are set based on the following criteria 11(A)~11(C) within each domain.

11. If the definition of the connection between the domains is set as shown in the inter domain connection definition table 4, the criteria for determining the routing data required for the domains A, B and C that are defined in the domain definition table 2, are as follows:

A) Criterion for Determining Routing Data for Domain A:

The domain that permits the connection from the domain A is only the domain A. Hence, among pieces of routing data registered in the routing table 10, the routing data of which the domain A is notified of, is only the routing data "IF-0" registered in the forwarding logical interface field. Note that the relay system 1 is capable of exchanging the routing data with the domain A.

B) Criterion for Determining Routing Data for Domain B:

The domains that permit the connection from the domain B are the domains A, C and the domain B itself. Therefore, among pieces of routing data registered in the routing table 10, the routing data of which the domain B is notified of, are basically all pieces of data in the routing table 10. If all the routing data on the Internet are distributed into the intra-organization network, the traffic becomes large enough to lose the function of the routing table 10. Such being the case, only the data about a default route (entry such as the destination IP address=0.0.0.0) is normally distributed as a piece of extra-organization data to the intra-organization network. Note that the relay system 1 is capable of exchanging the routing data with the domain B.

C) Criterion for Determining Routing Data for Domain C:

The domain C is independently connected to the Internet. If the relay system 1 is aware of both of the Internet on the domain A and the Internet connected to the domain C, the routing data fall into the confusion. Therefore, the relay system 1 does not exchange the routing data with the domain C but statically sets the routing data to the domain C.

With the processes executed above, the inter domain connection as set in the inter domain connection definition table 4 can be established.

<Modification of Logical Interface>

In the first embodiment, the relay system 1 corresponds (connectable) to each of the domains via one of the logical interfaces IF-0, IF-1 and IF-2. The embodiment of the present invention is not, however, limited to this architecture. For example, each of the physical interfaces 15a, 15b and 15c may correspond (connect) directly to each of the domains without through the logical interfaces IF-0 etc. In this case, the physical interface functions as an interface unit.

Thus, if each of the physical interfaces 15a, 15b and 15c corresponds to each of the domains, the physical interface having received the frame receives the packet, and then a source domain is determined.

<Modification of Address Translation>

In the first embodiment discussed above, as shown in FIG. 7, the before-translation IP address and the after-translation IP address are registered in the address translation table 7. The embodiment of the present invention is not, however, confined to the structure of the address translation table 7. For example, the address translation table 7 may be structured to contain information of the packet header, information on the forwarding/receiving logical interfaces, information on the forwarding/receiving physical interfaces, or information on the source/destination domains.

Further, in the first embodiment, the address translation module 7a sets the mapping of the source address of the packet reached from the source domain to the address for proxy host. The address for proxy host is usable in the destination domain and may be defined as the intra destination domain address pooled in the relay system 1. Instead of this, the address translation module 7a may map the header information on the network layer/transport layer that is usable in the destination domain and pooled in this relay system, to the header information of the packet reached from the source domain. For instance, the following address translation module NAPT may also be used.

A) The relay system 1 previously stores the address translation table 7 with a tuple of [a source IP address, a source port number, a destination IP address, a destination port number, a upper layer protocol number contained in the IP header, an after-translation source IP address, an after-translation source port number] of the packet. The relay system 1, when in the address translation, searches such an entry that the tuple of [the source IP address, the source port number, the destination IP address, the destination port number, the upper layer protocol number contained in the IP header, the after-translation source IP address, the after-translation source port number], is coincident with that of the packet. Then, the relay system 1 replaces [the source IP address, the source port number] of the packet with [the after-translation source IP address, the after-translation source port number] in the address translation table 7, and forwards the packet from the logical interface.

B) The relay system 1, when in the address reverse translation, searches such an entry that the tuple of [the destination IP address, the destination port number, the source IP address, the source port number, the upper layer protocol number contained in the IP header] of the packet, is coincident with the tuple of [the after-translation source IP address, the after-translation sourceport number, the destination IP address, the destination port number, the upper layer protocol number contained in the IP header] in the address translation table 7. Then, if this search is hit, the relay system 1 replaces [the destination IP address, the destination port number] of the packet with [the source IP address, the source port number] in the address translation table 7, and forwards the packet from the logical interface.

<Other Modified Examples>

The first embodiment has exemplified how the present invention is embodied in the network using the IP address as the address on the network layer. The embodiment of the present invention is not, however, limited to the IP-based network. For example, the present invention can be embodied also for the routing based on IPX (Internetwork Packet Exchange).

The first embodiment has involved the use of the domain definition table 2 stored with the mapping of the domains to the logical interfaces IF-0 etc. The embodiment of the present invention is not, however, limited to the structure of the information for defining the domain. Without using the table format, a data structure in which one or more pieces of information for identifying the domains are listed up per logical interface, may be stored with the information for defining the domains.

In accordance with the first embodiment, the inter domain connection judging module 4a, the address translation module 7a and the address reverse translation module 7b are structured as the software components of the control program executed by the CPU 14. The embodiment of the present invention is not, however, confined to this architecture. For instance, a dedicated LSI for executing these processes may also be used.

In the first embodiment, the domain definition module 2a is used for defining the elements in the domain definition table 2 and of the inter domain connection definition table 4. The embodiment of the present invention does not, however, treat the domain definition module 2a as an indispensable component. For example, if the relay system 1 is structured to read the elements in the domain definition table 2 and the inter domain connection definition table 4 from on a hard disk of a specified node (server), the domain definition module 2a may not be used.

(Second Embodiment)

In the first embodiment, the domain definition table 2 is defined by the domains and the logical interfaces IF-0 etc connected to these domains. A second embodiment will exemplify a case where the domain definition table 2 is defined by the domains and network addresses contained in the domains.

FIG. 9 shows an example of definition of the domain definition table 2 in that case. The configurations other than this in the second embodiment are the same as those in the first embodiment. Therefore, other configurations will be explained referring to FIGS. 1 through 4 or FIGS. 6 through 8.

<Architecture>

FIG. 9 shows an example of the definition of the domain definition table 2. As shown in FIG. 9, in the second embodiment, the domain definition table 2 contains pieces of data for identifying the IP address, the netmask and the domain. For example, the domain A has a network of which the IP address is 140.2.100.0 and the netmask is 255.255.255.0. If the domain includes a plurality of networks, relationships (the data for identifying the IP addresses and the netmasks of the networks, and the domain A) therebetween, are listed up in the domain definition table 2.

Further, in the lowest record in FIG. 9, an entry where the IP address is 0.0.0.0 is defined. This implies that packet addresses that do not fall under the category of the IP address defined in the entries upper than this definition line, all belong to the domain A.

<Function and Effect>

As discussed above, the second embodiment is substantially the same as the first embodiment other than the structure of the domain definition table 2, and therefore the processing by the relay system 1 is as shown in FIG. 4. The processing by the relay system 1 will hereinafter be described.

1. In the second embodiment also, the relay system 1 executes the same processes as the operations 1~5 in the first embodiment.

2. In the second embodiment, however, instead of recognizing the domain by the logical interface as described in the operation 6 in the first embodiment, the relay system 1 obtains the source domain and the destination domain from the source IP address and the destination IP address of the packet (S8).

3. Further, the relay system 1 executes the same processes as the operations 7 through 10 in the first embodiment.

Note that as in the first embodiment, the domain B, it is assumed, knows the routing data about the domains A, C. This is actualized by any one of the following conditions c) and d).

c) The relay system 1 exchanges the routing data with each of the domains on the basis of the following criteria 12(A)~12(C).

d) The routing data are set based on the following criteria 12(A)~12(C).

12. If the definition of the connection between the domains is set as shown in the inter domain connection definition table 4, the criteria for determining the routing data required for the domains A, B and C that are defined in the domain definition table 2, are as follows:

A) Criterion for Determining Routing Data for Domain A:

The domain that permits the connection from the domain A is only the domain A. Hence, among pieces of routing data registered in the routing table 10, the routing data of which the domain A is notified of, is only the routing data containing the destination IP address included in the domain A. Note that the relay system 1 is capable of exchanging the routing data with the domain A.

B) Criterion for Determining Routing Data for Domain B:

The domains that permit the connection from the domain B are the domains A, C and the domain B itself. Therefore, among pieces of routing data registered in the routing table 10, the routing data of which the domain B is notified of, are basically all pieces of data in the routing table 10. If all the routing data on the Internet are distributed into the intra-organization network, the traffic becomes large enough to lose the function of the routing table 10. Such being the case, only the data about a default route (entry such as the destination IP address=0.0.0.0) is normally distributed as a piece of extra-organization data to the intra-organization network. Note that the relay system 1 is capable of exchanging the routing data with the domain B.

C) Criterion for Determining Routing Data for Domain C:

The domain C is independently connected to the Internet. If the relay system 1 is aware of both of the Internet on the domain A and the Internet connected to the domain C, the routing data fall into the confusion. Therefore, the relay system 1 does not exchange the routing data with the domain C but statically sets the routing data to the domain C.

With the processes described above, as in the first embodiment, the restrictive inter domain connection can be established.

<Modification Using Combination of Authentication Server with Domain Connecting Function>

The relay system 1 for providing the restrictive inter domain connection described above, is used in combination with the authentication server, whereby the restrictive inter domain connection having a more ensured security can be established.

Figure 10:
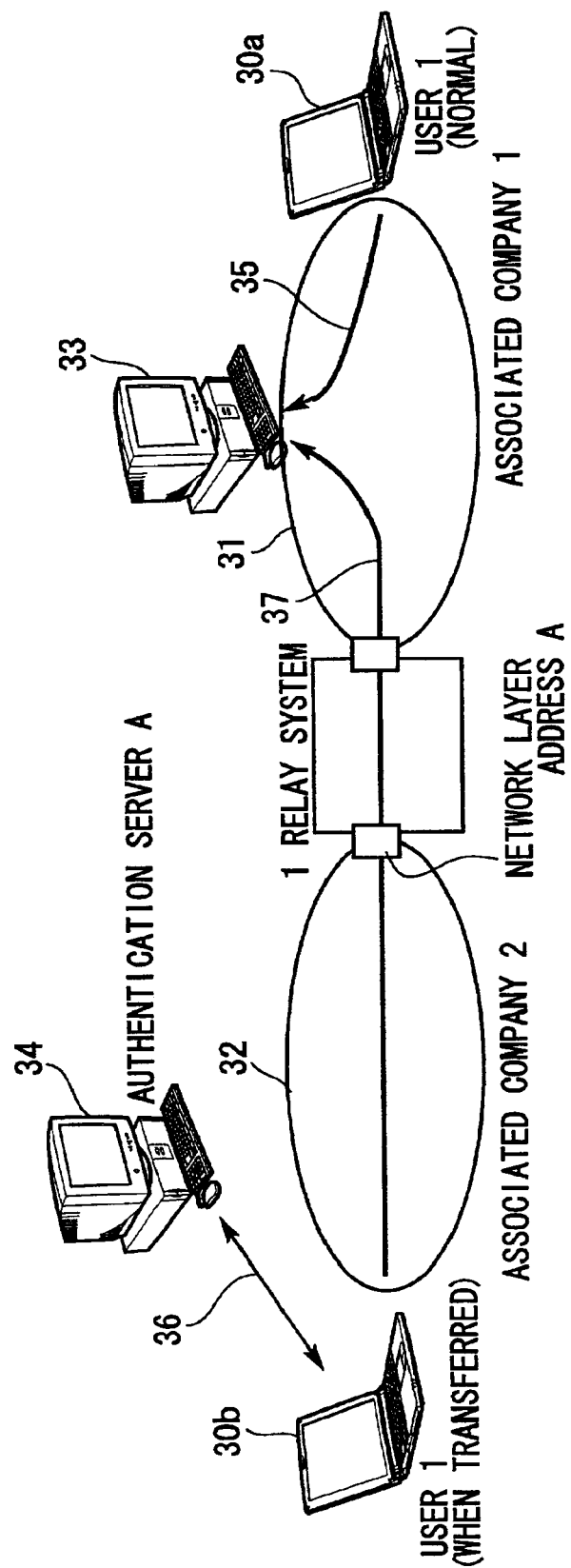
FIG. 10 is a view showing a network architecture based on a combination of the relay system 1 with an authentication server.

FIG. 10 is a view showing this type of network architecture.

A network 31 of the associated company 1 in a certain domain and a network 32 of the associated company 2 in a different domain, are connected to each other by the relay system 1 demonstrated in the second embodiment (or the first embodiment). The network 31 and the network 32 are partitioned from other different domains. Therefore, the associated companies 1, 2 normally do not have each other the routing data to other associated companies.

Given herein is an explanation of a network connection method for a user 30*a* transferred to the associated company 2 from the associated company 1 to access a node within the network 31 of the associated company 1 after ensuring the security.

Initially, this user has accessed a node 33 via a route 35 in the network 31 as the user 30*a* on the network 31. At the present, however, this user is connected as a user 30*b* on the network 32 of the associated company 2.

In this case, the user 30*b* requests the authentication server 34 on the associated company 2 to issue an authentication 36. If the user 30*b* succeeds in obtaining the authentication 36, the server 34 requests the relay system 1 to dynamically create a network layer address A for the relay system 1 to behave as a proxy of the node 33 in the network 31. The server 34 notifies the user 30*b* of the thus created network layer address A. The network layer address A is replaced with an address of the node 33 in the network 31 by the relay system 1.

Accordingly, the user 30*b* connects to the network layer address A dynamically created by this relay system 1 and thereby becomes communicable with the network 31 of the associated company 1 via a route 37.

Whereas if unsuccessful for obtaining the authentication, the notification of the address on the relay system 1 is not made, thereby ensuring the security of the network 31.

Thus, the connections with the security ensured between the multiplicity of networks are actualized by combining the relay system in the second embodiment with the authentication server 34. Note that even when this authentication server 34 is combined with the relay system 1 in the first embodiment, the function and the effect are the same as those in the second embodiment.

<Other Modified Examples>

In the second embodiment, the domain definition table 2 is defined by specifying the network embraced by the domain with the IP address and the netmask. The embodiment of the present invention is not, however, limited to the mode of specifying the network in the domain definition table 2 described above. For example, the network embraced by each domain may be specified by an upper limit value and a lower limit value of the IP address. The domain may also be defined by listing up the IP addresses of all the nodes contained in each domain.

The second embodiment has exemplified the case where the present invention is applied to the network involving the use of IP as the network layer protocol. The embodiment of the present invention is not, however, confined to the category of the network layer protocol if on the network layer capable of the address translation in the relay system.

In accordance with the second embodiment, the inter domain connection judging module 4*a*, the address translation module 7*a* and the address reverse translation module 7*b* are structured as the software components of the control program executed by the CPU 14. The embodiment of the present invention is not, however, limited to this architecture. For example, the dedicated LSI for executing these processes may also be used.

(Third Embodiment)

The first embodiment has exemplified the case where the restrictive connection between the domain can be established by defining the domain definition table 2 with the respective domains and the logical interfaces IF-0, IF-1, IF-2 connected to these domains. A third embodiment will exemplify a process of detecting and discarding an unauthorized packet during the packet forwarding between the domains by use of the domain definition table 2 described above.

Figure 11:
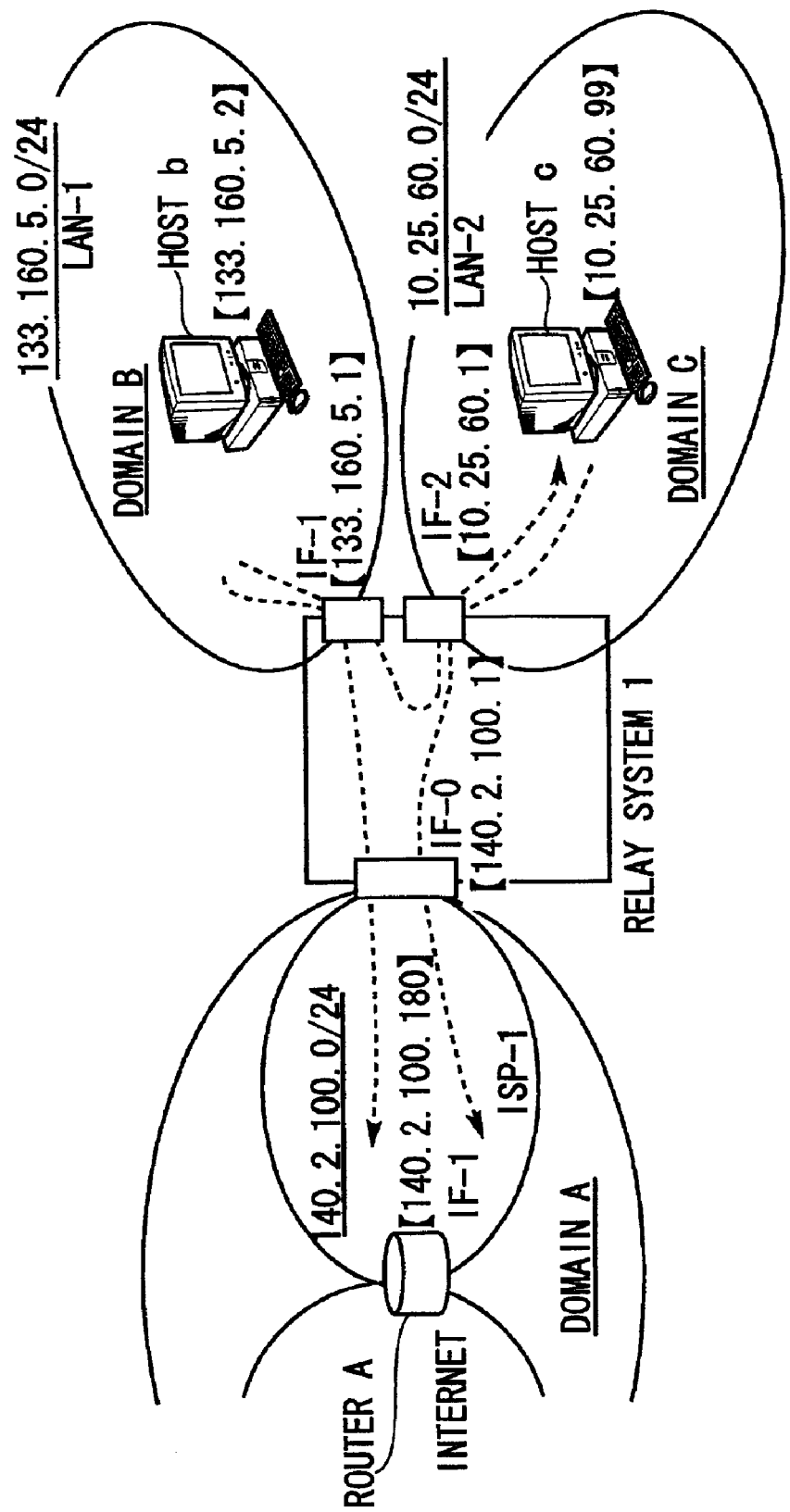
FIG. 11 is a view showing a network architecture in a third embodiment.
Figure 13:
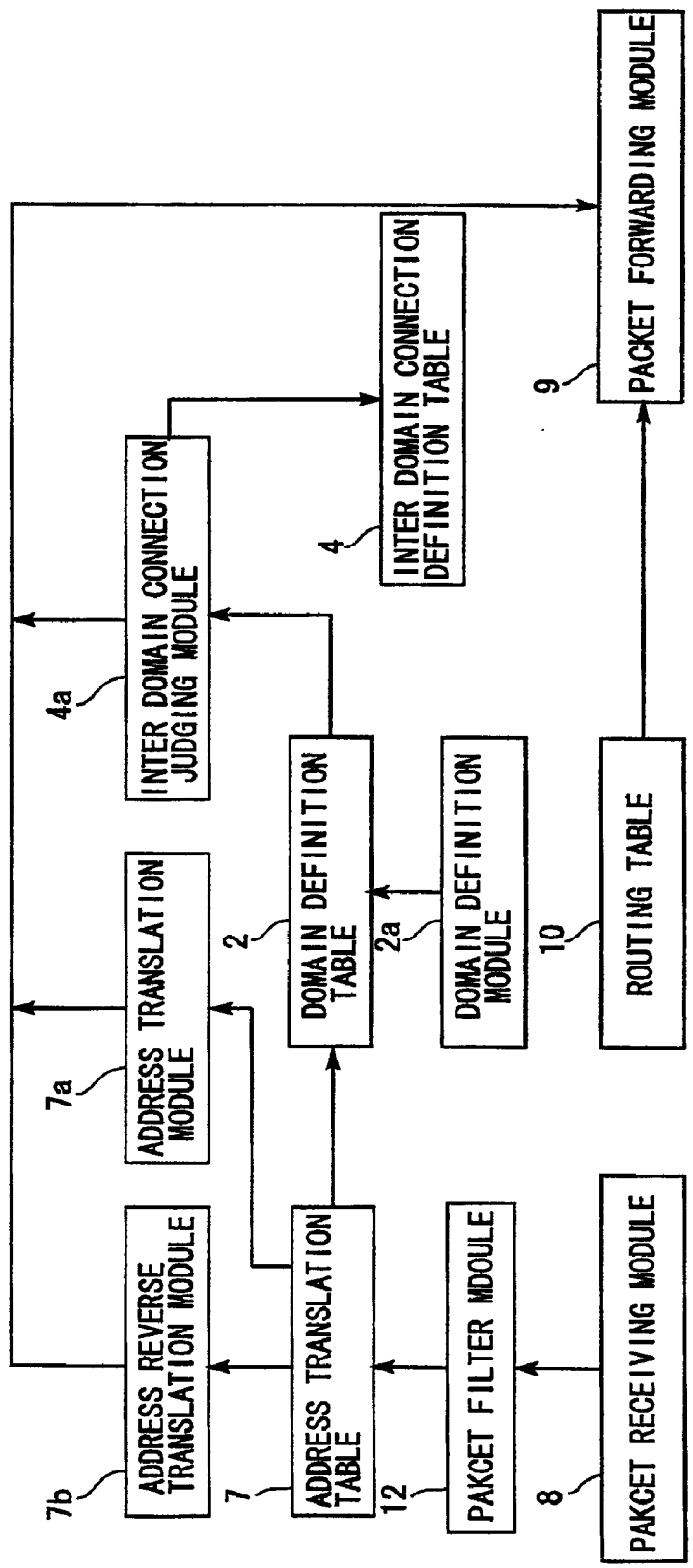
FIG. 13 is a view showing an architecture of functions of the relay system 1 in the third embodiment.
Figure 14:
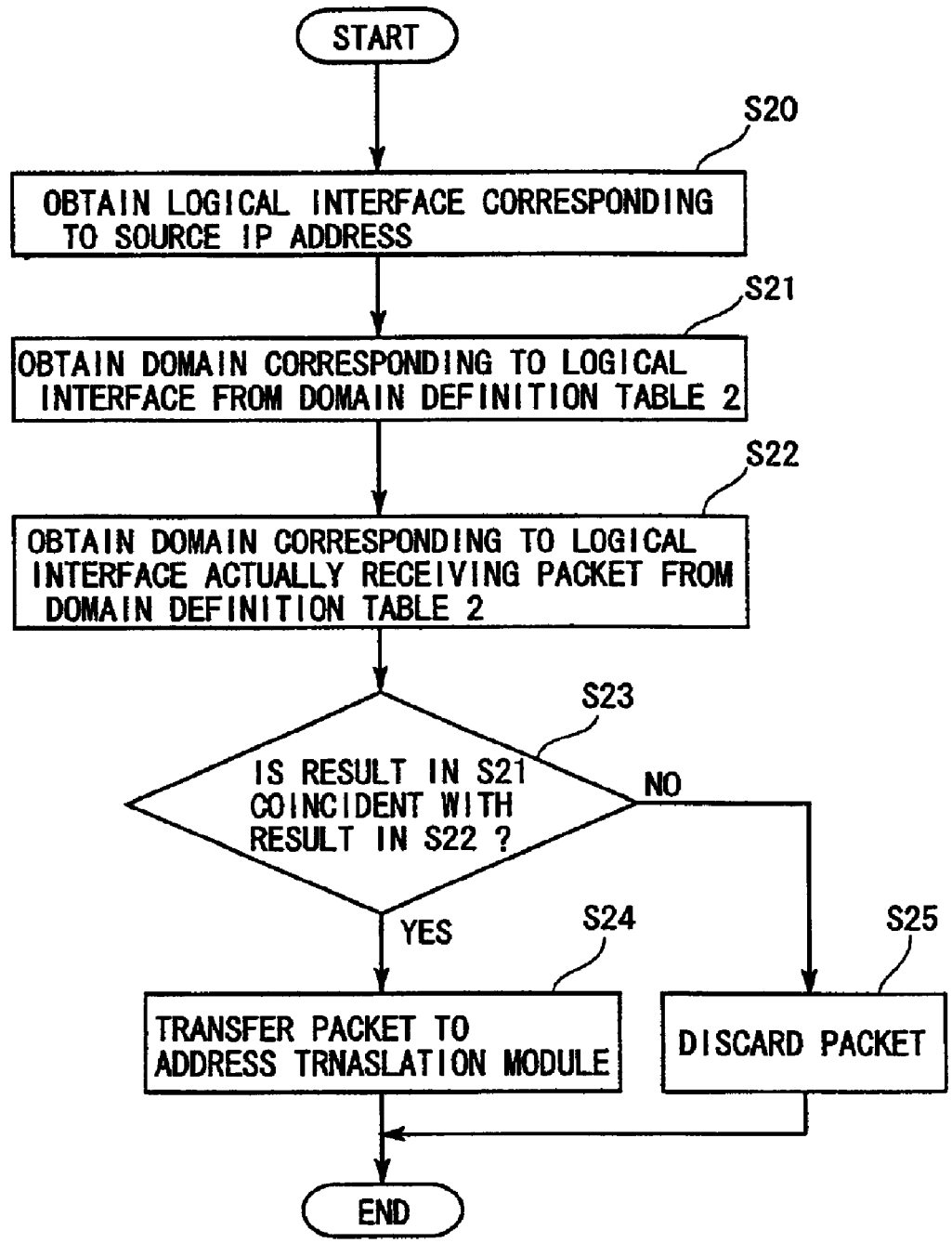
FIG. 14 is a flowchart showing processes of a packet filter module 12.

FIG. 11 is a view showing a network architecture in the third embodiment. FIG. 12 shows an example of setting the inter domain connection definition table 4 in the third embodiment. FIG. 13 is a diagram showing an architecture of the functions of the relay system 1 in this case. FIG. 14 is a flowchart showing the processes of the relay system 1 in the third embodiment. Other configurations in the third embodiment are the same as those in the first embodiment, and therefore the same components are marked with the same numerals, of which repetitive explanations are omitted.

<Architecture>

As shown in FIG. 11, unlike the first embodiment, the domain C does not independently have the connection route to the Internet and is connected to the Internet via ISP-1 as in the case of the domain B.

FIG. 12 shows the setting of the inter domain connection definition table 4 with respect to this connection policy. As shown in FIG. 12, the domain A is capable of forwarding the packet to only the domain A itself. The domain B is capable of forwarding the packet to the domains A and C. the domain C is capable of forwarding the packet to the domain A in addition to the domain C itself.

Herein, supposing that the packet with the domain C being the source domain is forwarded from the domain B to the domain A, there might be a possibility in which this packet with its address being translated is to be forwarded to the domain A in spite of its being the unauthorized packet. For preventing this, in addition to the processes explained in the first embodiment, the relay system 1 judges whether or not the domain corresponding to the logical interface having received the packet is different from the domain corresponding to the logical interface to which source address of the communication data is mapped by the routing table 10. Then, the relay system 1 includes a packet filter module 12, as a component of the control program, for discarding this packet if these two domains are different from each other.

Routing table is used in the past to obtain an address of next hop node or next forwarding interface by searching the entry containing destination IP address which coincides the value of destination address of packet masked by net-mask contained in the same entry. On the other hand, the relay system 1 in the explained in the embodiment uses routing table as followings besides the usual usage in the past.

Namely, the relay system 1 uses routing table to obtain forwarding interface by searching an entry containing destination IP address which coincides the value of source address of packet masked by net-mask contained in the same entry.

FIG. 13 is a diagram showing an architecture of the functions in the third embodiment. The architecture in FIG. 13 is substantially the same as the architecture (FIG. 3) of the functions in the first embodiment, excluding such a point that the packet filter module 12 is added. Namely, in the third embodiment, the packet filter module 12 checks the packet received by the packet receiving module 8, and discards an unauthorized packet.

<Function and Effect>

FIG. 14 shows processes of the packet filter module 12 of the relay system 1. Herein, as described above, it is assumed that the packet addressed to the node belonging to the domain A from the node belonging to the domain B, is the unauthorized packet. It is presumed that the address of the node belonging to the domain C is mistakenly set in this packet, and the same packet is transferred to the relay system 1 via the logical interface IF-1 from the domain B.

1. The relay system 1 searches the source IP address of the received packet from the routing table 10, thereby obtaining the logical interface corresponding to this IP address (S20).

In this case, the source node belongs to the domain C, and hence the relay system 1 obtains the logical interface IF-2 from the routing table 10.

2. On the other hand, the relay system 1 refers to the domain definition table 2 (FIG. 5) shown in the first embodiment, and thus obtains the domain C corresponding to the logical interface IF-2 (S21).

3. Next, the relay system 1 obtains, from the domain definition table 2, the domain B to which the logical interface having actually received this packet belongs (S22).

4. Subsequently, the relay system 1 judges whether or not the result obtained in S21 is coincident with the result acquired in S22 (S23). If coincident with each other, this packet is transferred to the address translation module (S24).

Whereas if not coincident, the source domain of this packet is different from a domain that should be the (true) source domain. Accordingly, this packet is judged to be an unauthorized packet, and therefore the relay system 1 discards this unauthorized packet (S25).

With these processes described above, it is feasible to prevent the packet having a fraud value as the source IP address from being routed unnoticeably.

<Modified Example>

In the third embodiment, the inter domain connection judging module 4a, the address translation module 7a, the address reverse translation module 7b and the packet filter module 12 are configured as the components of the control program executed by the CPU 14. The embodiment of the present invention is not, however, limited to this architecture. For example, the dedicated LSI for executing those processes may also be used.

What is claimed is:

1. A relay system relaying between two or more networks to which one or more communication devices are connected, comprising:

two or more interface units accessing said networks;

a domain definition table defining domains as a system framework including one or more networks;

an inter domain connection definition table defining connectability between two or more domains;

a routing module storing a routing destination of communication data;

an address translation module for translating, when forwarding communication data from a first domain to a second domain, a first address belonging to the first domain contained in a source address field of the communication data into a second address being an address of the relay system as recognized in the second domain;

an address reverse translation module for translating, when receiving communication data having the second address in a destination address field, the second address into the first address belonging to the first domain; and an inter domain connection judging module controlling connectability for routing between the two or more domains in accordance with definitions of said inter domain connection definition table.

2. A relay system according to claim 1, wherein said domain definition table defines each domain by information for identifying an interface unit connected to a domain.

3. A relay system according to claim 1, wherein said inter domain connection judging module discards communication data when a domain corresponding to an interface unit receiving the communication data, is different from a domain to which the source address of the communication data belongs.

4. A relay system according to claim 1, wherein said domain definition table is defined per domain by an address for identifying a network included in the domain.

5. A communication data relay method for relaying between two or more networks to which one or more communication devices are connected, comprising:

referring to a domain definition table defining domains as a system framework including one or more networks;

referring to an inter domain connection definition table for defining connectability between two or more domains;

referring to a routing module storing a routing destination of the communication data;

translating, when forwarding communication data from a first domain to a second domain, a first address belonging to the first domain contained in a source address field of the communication data into a second address being an address of the relay system as recognized in the second domain;

reverse translating, when receiving communication data having the second address in a destination address field, the second address into the first address belonging to the first domain; and controlling connectability for routing between the two or more domains in accordance with definitions of said inter domain connection definition table.

6. A relay system according to claim 1, wherein said inter domain connection judging module discards communication data when an interface unit receiving the communication data, is different from an interface unit corresponding to the domain to which a source address of the communication data belongs.

7. A relay system according to claim 1, wherein said domain definition table is defined per domain by an address for identifying the communication device connected to the network included in the domain.

* * * * *